US011256645B2

(12) United States Patent
Monnier et al.

(10) Patent No.: US 11,256,645 B2
(45) Date of Patent: Feb. 22, 2022

(54) METHOD FOR AUTHENTICATING AN EQUIPMENT, ASSOCIATED EMITTING DEVICE, RECEPTION DEVICE, COMMUNICATION SYSTEM AND AIRCRAFT

(71) Applicant: THALES, Courbevoie (FR)

(72) Inventors: Stéphane Monnier, Merignac (FR); Vincent Guihard, Merignac (FR); Daniel Poncin, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/717,733

(22) Filed: Dec. 17, 2019

(65) Prior Publication Data
US 2020/0201801 A1    Jun. 25, 2020

(30) Foreign Application Priority Data

Dec. 21, 2018 (FR) ...................... 18 73903

(51) Int. Cl.
*G06F 13/40* (2006.01)
*G06F 13/42* (2006.01)
*H04L 69/22* (2022.01)

(52) U.S. Cl.
CPC .......... *G06F 13/4022* (2013.01); *G06F 13/42* (2013.01); *H04L 69/22* (2013.01)

(58) Field of Classification Search
CPC ............................. G06F 4022/42; H04L 69/22
See application file for complete search history.

(56) References Cited

U.S. PATENT DOCUMENTS

| 7,061,936 | B2 * | 6/2006  | Yoshimura | ............. | H04L 29/06  |
|           |      |         |           |               | 370/349     |
| 7,222,360 | B1   | 5/2007  | Miller    |               |             |
| 9,661,549 | B2 * | 5/2017  | Lim       | ..............| H04W 40/023 |
| 10,165,094| B2 * | 12/2018 | Sun       | ..............| H04L 69/22  |
| 2005/0152359 | A1 * | 7/2005 | Giesberts | ............. | H04L 69/324 |
|           |      |         |           |               | 370/389     |
| 2008/0019263 | A1 * | 1/2008 | Stolpman  | ............. | H04L 5/0037 |
|           |      |         |           |               | 370/210     |

(Continued)

OTHER PUBLICATIONS

Bartoli, A., et al., "Secure Lossless Aggregation Over Fading and Shadowing Channels for Smart Grid M2M Networks", IEEEE Transactions on Smart Grid, XP011380186, vol. 2, No. 4, pp. 844-862 (2011).

(Continued)

*Primary Examiner* — Henry Tsai
*Assistant Examiner* — Aurangzeb Hassan
(74) *Attorney, Agent, or Firm* — Arent Fox LLP

(57) ABSTRACT

The invention relates to a method for authentication of a piece of equipment by a communication system, comprising:
  a step for exchanging at least one data frame between a first piece of equipment and a second piece of equipment through a communication bus using a packet switching protocol, the data frame including a preamble and a message body,
  a step for searching in each exchanged data frame for the presence of a marker in the preamble, the marker being specific to the communication system, and
  only when the marker has been found by the second piece of equipment in a data frame, a step for authenticating the first piece of equipment.

4 Claims, 2 Drawing Sheets

(56) References Cited

U.S. PATENT DOCUMENTS

| | | | |
|---|---|---|---|
| 2008/0259905 A1* | 10/2008 | Connors | H04W 36/02 370/350 |
| 2014/0137210 A1* | 5/2014 | Kountouris | H04W 12/1201 726/4 |
| 2015/0373154 A1 | 12/2015 | Voigt et al. | |
| 2016/0056905 A1* | 2/2016 | Hartlmueller | H04J 3/0697 375/354 |
| 2016/0285834 A1* | 9/2016 | Lee | H04L 63/0876 |
| 2017/0207905 A1* | 7/2017 | Eitan | H04L 5/0055 |

OTHER PUBLICATIONS

French Search Report issued by the French Patent Office in corresponding French Application No. 1873903, dated Oct. 8, 2019.

* cited by examiner

METHOD FOR AUTHENTICATING AN EQUIPMENT, ASSOCIATED EMITTING DEVICE, RECEPTION DEVICE, COMMUNICATION SYSTEM AND AIRCRAFT

This patent application claims the benefit of document FR 18 73903 filed on Dec. 21, 2018, which is hereby incorporated by reference.

FIELD OF THE INVENTION

The present invention relates to a method for authenticating a piece of equipment. The present invention also relates to an emitting device, a reception device, a communication system, as well as an aircraft that may all be involved in carrying out the authentication method.

BACKGROUND OF THE INVENTION

In order to ensure the security of a communication system, unauthorized equipment connections should be detected.

To that end, in non-embedded communications systems, it is known to implement complex authentication mechanisms guaranteeing security. The complexity of such mechanisms is not compatible with high-level design quality assurance processes that are found in critical embedded systems in the aeronautics field.

Therefore, in such embedded systems, only the cutting of physical connections is monitored and detected.

However, such a detection does not make it possible to separate the rebooting of a third-party piece of equipment from a connection of a new piece of equipment. Additionally, this does not make it possible to detect an illegitimate piece of equipment, when the latter is connected upon rebooting of the system.

SUMMARY OF THE INVENTION

There is therefore a need for a method for authenticating equipment using a communication system that provides better security and that is compatible with an application to an embedded system.

To that end, a method is described for authentication of a piece of equipment by a communication system, the method comprising a step for exchanging at least one data frame between a first piece of equipment and a second piece of equipment through a communication bus using a packet switching protocol, the data frame including a preamble and a message body, a step for searching in each exchanged data frame for the presence of a marker in the preamble, the marker being specific to the communication system, and only when the marker has been found by the second piece of equipment in a data frame, a step for authenticating the first piece of equipment.

According to specific embodiments, the method comprises one or more of the following features, considered alone or according to any technically possible combinations:
  during the searching step, the second piece of equipment determines the size of the preamble and compares the determined size to a predefined size, the second piece of equipment finding the marker if the determined size differs from the predefined size,
  the predefined size is obtained by analysis of a plurality of exchanged data frames, the predefined size being the most frequent size of the analyzed frames, and
  the preamble includes synchronization data and wherein, during the searching step, the second piece of equipment looks for any presence of data in the preamble not belonging to the synchronization data.

The present description also relates to a device for emitting a data frame through a communication bus using a packet switching protocol, the data frame comprising a preamble, the emitting device being able to modify the preamble.

The present description also relates to a device for receiving a data frame emitted through a communication bus using a packet switching protocol, the data frame comprising a preamble, the reception device being able to identify a marker in the preamble.

The present description also relates to a piece of equipment including at least one device among an emitting device as previously described and a reception device as previously described.

The present description also relates to a communication system including a piece of equipment as previously described and a communication bus.

The present description also relates to an aircraft comprising a communication system as previously described.

BRIEF DESCRIPTION OF THE DRAWINGS

Other features and advantages of the invention will appear upon reading the following description of embodiments of the invention, solely as an example and done in reference to the drawings, which are:
FIG. 1 shows an aircraft 10.

DETAILED DESCRIPTION OF PREFERRED EMBODIMENTS

Figure 1:
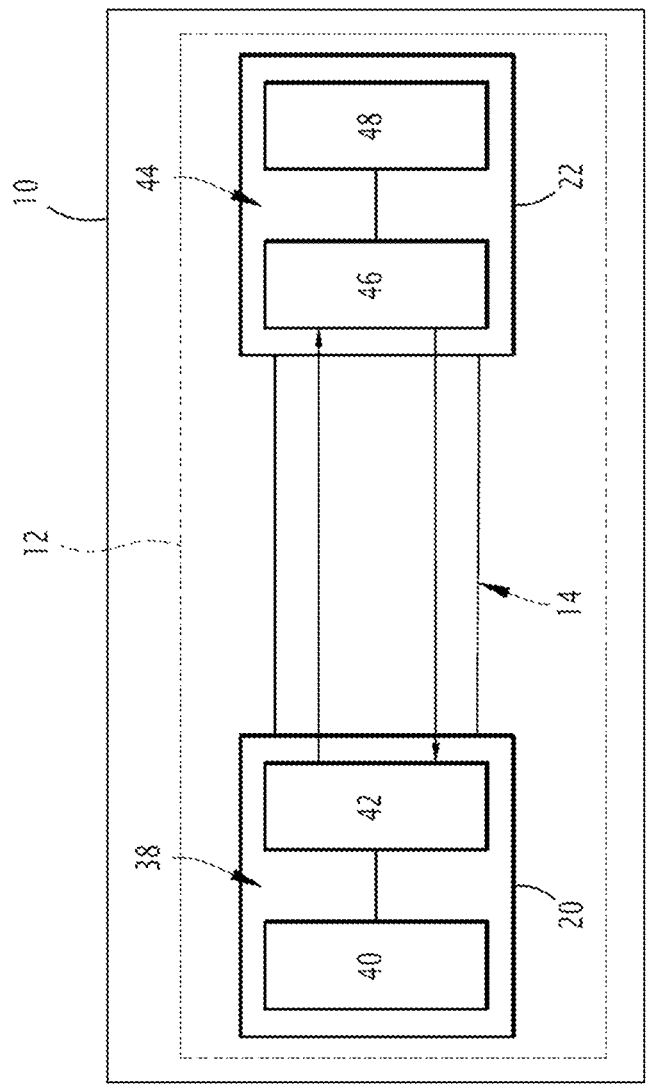
FIG. 1, a schematic view of an aircraft including pieces of equipment, and
  FIG. 2, a schematic illustration of an example data frame exchanged between two pieces of equipment of the aircraft of FIG. 1.

An aircraft is a moving vehicle piloted by at least one pilot (who may be on the ground), and in particular able to fly in the Earth's atmosphere, such as an airplane, a drone or a helicopter.

As an illustration, it is assumed that the aircraft 10 is an airplane.

According to the proposed example, the aircraft 10 includes multiple embedded elements, among which is a communication system 12.

The communication system 12 ensures the communication between the members belonging to the communication system 12.

The communication system 12 is a communication system using a packet switching protocol.

In particular, the packet switching protocol is an Ethernet protocol.

More specifically, the protocol of the switching system is a protocol having the low-level layers (layer below level 3 according to the OSI standard) of standard IEEE 802.3, for example part 3 or part 7 of standard ARINC 664, or the TSN standard.

In the example of FIG. 1, the communication system 12 includes a communication bus 14, a first piece of equipment 20 and a second piece of equipment 22.

A communication bus 14 is a data transmission device shared among several electronic components.

In the case of FIG. 1, the communication bus 14 is able to allow the exchange of data between the two pieces of equipment 20 and 22.

For example, one piece of equipment is an avionics mission computer communicating with a flight parameter display, or a data concentrator communicating with an avionics network switch.

More generally, in this context, equipment refers to an electronic apparatus able to perform a defined function for the aircraft 10 and able to communicate with the other pieces of equipment through the communication bus 14.

The first piece of equipment 20 and the second piece of equipment 22 are thus able to exchange data frames through the communication bus 14.

Figure 2:
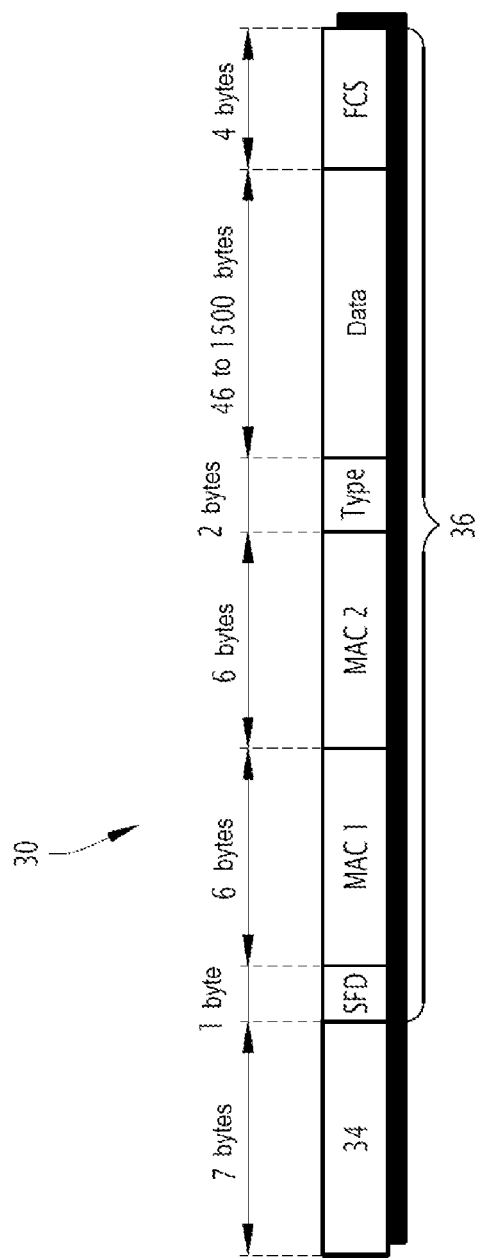

In particular, the two pieces of equipment 20 and 22 are able to exchange a data frame 30 shown in FIG. 2.

The data frame 30 corresponds to the architecture imposed for a protocol having the low-level layers of standard IEEE 802.3.

The data frame 30 includes two successive parts: a preamble 34 followed by a message body 36.

In the specific example of the frame of FIG. 2, the preamble 34 includes synchronization data DS and identification data DI.

The synchronization data DS are a series of bits.

The synchronization data DS are able to ensure the synchronization of the piece of equipment that receives said frame.

To that end, the synchronization data DS assume predefine values. As an illustration, each of the bytes of the synchronization data assumes the value 10101010.

According to the described example, the preamble 34 has a size of 7 bytes.

In a variant, the size of the preamble 34 varies between 6 bytes and 2 bits, and 7 bytes and 6 bits.

The identification data DI include bits specific to the communication system 12 and constitute a marker.

It should be noted that the presence of the identification data DI for the preamble 34 is original relative to the requirements of standard IEEE 802.3.

The message body 36 includes a plurality of fields. According to the example of FIG. 2, the message body 36 comprises six fields C1 to C6.

The first field C1 is a starting frame delimiter field. The first field C1 is also designated using the term SFD (Starting Frame Delimiter) field.

The first field C1 has a size of one byte.

The second field C2 is a destination address.

The destination address is an address used at the Media Access Control (MAC) sublayer.

The second field C2 is also called MAC 1 field.

According to the illustrated example, the second field C2 has a size of 6 bytes.

The third field C3 is the source address, that is to say, the address of the element having emitted the frame.

Like for the field MAC1, the source address is an address used at the MAC sublayer such that the third field C3 is also called MAC2 field.

The third field C3 has a size of 6 bytes.

The fourth field C4 is a field called "Type" field.

The fourth field C4 serves to indicate the protocol used.

The fourth field C4 occupies a size of 2 bytes.

The fifth field C5 corresponds to the data field, also called payload.

Depending on the case, the size of the fifth field C5 is between 46 bytes and 1500 bytes.

The sixth field C6 is the end field.

The sixth field C6 is the FCS (Frame Check Sequence) field.

The sixth field C6 extends over 4 bytes.

According to the described example, the first piece of equipment 20 comprises an emitting device 38.

The emitting device 38 is made in the form of programmable logic components such as an FPGA (Field-Programmable Gate Array) circuit, or in the form of dedicated integrated circuits, such as an ASIC (Application-Specific Integrated Circuit).

The emitting device 38 includes a first controller 40 and an emitter 42.

The first controller 40 is able to generate data frames to be emitted.

The frames generated by the first controller 40 are similar in terms of structure to the data frames 30 of FIG. 2.

The first controller 40 is further able to modify the preamble 34 of the generated frames.

In particular, the first controller 40 is able to modify the value of the identification data DI so that the identification data DI include a marker. The marker is then a series of bits that is specific to the communication system 12.

The first controller 40 is connected to the emitter 42.

The emitter 42 is able to emit the frames generated by the first controller 40, to the second piece of equipment 22.

The emitter 42 emits the frames through the communication bus 14, which links the two pieces of equipment 20 and 22.

The second piece of equipment 22 includes a reception device 44.

The reception device 44 can be physically made like the emission device 38, typically in the form of an FPGA circuit.

The reception device 44 includes a receiver 46 and a second controller 48.

The receiver 46 is able to receive data frames, and in particular a frame emitted by the emission device 38 of the first piece of equipment 20.

To that end, the receiver 46 is able to synchronize itself with the reception of the data frame 30 on the reception of the synchronization data DS.

The second controller 48 is able to identify a marker in the preamble 34 of a frame received by the receiver 46.

Furthermore, in the described example, the emission device 38 of the first piece of equipment 20 and the reception device 44 of the second piece of equipment 22 have exchangeable roles such that the reception device 44 is able to emit a data frame intended for the emission device 38.

In particular, this means that the first controller 40 and the second controller 48 are able to perform the same operations and that the emitter 42 and the receiver 46 are emitters-receivers.

The operation of the communication system 12 is now described in reference to an exemplary embodiment of a method for authenticating a piece of equipment.

The authentication method seeks to authenticate a piece of equipment.

According to the illustrated example, it is assumed that the application method seeks to authenticate the first piece of equipment 20 in order to verify that the first piece of equipment 20 can be accepted by the communication system 12.

The method includes an exchange step, a searching step and optionally an authentication step.

During the exchange step, a data frame according to FIG. 2 is exchanged between the first piece of equipment 20 and the second piece of equipment 22.

According to the described example, the data frame includes a specific marker of the communication system 12.

More specifically, the first controller 40 emits a data frame including the marker. The emitter 42 emits the frame toward the receiver 46, which receives it.

During the searching step, the second controller 48 looks for the presence of a specific marker expected in the frame received by the receiver 46.

More specifically, the second controller 48 looks for any presence of data in the preamble 34 not belonging to the synchronization data DS, corresponding to identification data DI, and looks for the presence of the marker in the identification data DI.

During the authentication step, the second controller 48 authenticates the first piece of equipment 20 only if the specific marker has been found by the second controller 48.

By exchanging the role of the first piece of equipment 20 and the second piece of equipment 22, a similar method can be used to perform an authentication of the second piece of equipment 22 by the first piece of equipment 20.

In short, the identification data DI allow a receiver piece of equipment to authenticate an emitter piece of equipment, that is to say, to verify the identity of the piece of equipment emitting the data frame 30, by identifying a marker in the identification data DI, the marker being a series of bits specific to the communication system 12.

The method is thus a method making it possible to authenticate the connection of a piece of equipment 20 or 22 on the communication bus 14 of the communication system 12 simply and discreetly with respect to an outside observer of the communication bus 12.

The simplicity of implementation of the method in particular results from the fact that it suffices to use a dedicated circuit as emission or reception device, which makes the method compatible with the certification constraints in the aviation field.

The method is discrete with respect to an outside observer inasmuch as the modification made to the frame is minor and the most typical tools in the state of the art only use the preamble for synchronization and do not make it visible to the user.

To reinforce this discretion, it is advantageous for the modification of the frames only to be implemented for certain frames and not all of the frames emitted by the first piece of equipment 20.

In the example that has been illustrated, the specific marker of the communication system 12 is a set of specific bits included in the preamble 34.

According to one variant, the marker is a variation of the size of the preamble 34.

The size variation is small enough to respect standard IEEE 802.3.

The variation in the size of the preamble 34 is obtained by adding data to the preamble 34.

Such a variant then uses the fact that standard IEEE 802.3 allows a variation in the size of the preamble 34.

The size variation can also be obtained by eliminating data among the synchronization data DS by using the fact that several bytes suffice to ensure the synchronization, bytes of the preamble 34 not being used.

In such a case, during the searching step, the second piece of equipment 22 determines the size of the preamble 34 and compares the determined size to a predefined size, the second piece of equipment 22 finding the marker if the determined size differs from the predefined size.

One manner of determining the predefined size is to analyze a plurality of exchanged data frames, the predefined size being the most frequent size of the analyzed frames.

The invention claimed is:

1. A method for authentication of a piece of equipment by a communication system, comprising steps:
    exchanging at least one data frame between a first aircraft component and a second aircraft component through a communication bus using a packet switching protocol, the at least one exchanged data frame including a preamble and a message body,
    searching in the at least one exchanged data frame for a presence of a marker in the preamble, the marker being specific to the communication system, wherein during searching, the second aircraft component determines a size of the preamble and compares the size of the preamble to a predefined size, the second aircraft component identifying the marker when the size of the preamble differs from the predefined size, and
    when the marker has been identified by the second aircraft component in the at least one exchanged data frame, authenticating the first aircraft component.

2. The method according to claim 1, wherein the predefined size is obtained by analysis of a plurality of exchanged data frames, the predefined size being a most frequent size of the plurality of exchanged data frames.

3. The method according to claim 1, wherein, the preamble includes synchronization data and wherein, during the searching, the second aircraft component searches for a presence of data in the preamble not belonging to the synchronization data.

4. The method of claim 1, wherein the first aircraft component is an emitting device for emitting the data frame through the communication bus using the packet switching protocol, the data frame comprising the preamble, the emitting device being configured to modify the preamble.

* * * * *